United States Patent
Takahira et al.

(10) Patent No.: US 9,394,467 B2
(45) Date of Patent: Jul. 19, 2016

(54) METHOD FOR PRODUCING RELEASE LINER

(75) Inventors: Hitoshi Takahira, Ibaraki (JP); Satomi Yoshie, Ibaraki (JP); Shigeki Ishiguro, Ibaraki (JP); Hiroki Senda, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 486 days.

(21) Appl. No.: 14/005,915

(22) PCT Filed: Mar. 7, 2012

(86) PCT No.: PCT/JP2012/055822
§ 371 (c)(1),
(2), (4) Date: Sep. 18, 2013

(87) PCT Pub. No.: WO2012/128042
PCT Pub. Date: Sep. 27, 2012

(65) Prior Publication Data
US 2014/0004360 A1 Jan. 2, 2014

(30) Foreign Application Priority Data

Mar. 24, 2011 (JP) ................................. 2011-066217

(51) Int. Cl.
C09D 183/04 (2006.01)
C09J 7/02 (2006.01)
C08J 7/04 (2006.01)
B29C 71/02 (2006.01)
B05D 3/06 (2006.01)
B05D 5/08 (2006.01)
B05D 7/04 (2006.01)
B05D 3/02 (2006.01)

(52) U.S. Cl.
CPC ............... *C09J 7/0228* (2013.01); *C08J 7/047* (2013.01); *C08J 7/08* (2013.01); *C09D 183/04* (2013.01); *C09J 7/0235* (2013.01); *B05D 3/0209* (2013.01); *B05D 3/067* (2013.01); *B05D 5/08* (2013.01); *B05D 7/04* (2013.01); *C08J 2301/02* (2013.01); *C09J 2401/006* (2013.01); *C09J 2467/006* (2013.01); *C09J 2477/006* (2013.01); *C09J 2483/005* (2013.01); *Y10T 428/31663* (2015.04)

(58) Field of Classification Search
None
See application file for complete search history.

(56) References Cited

U.S. PATENT DOCUMENTS 6,057,041 A * 5/2000 Sumi .................. B32B 25/20
428/40.1

FOREIGN PATENT DOCUMENTS

| JP | 2001-225416 A | 8/2001 |
| JP | 2001-225417 A | 8/2001 |
| JP | 2003-026837 A | 1/2003 |
| JP | 2006-181816 | 7/2006 |
| JP | 4200405 B2 | 10/2008 |
| JP | 4200406 B2 | 10/2008 |
| JP | 4214254 B2 | 11/2008 |
| JP | 2009-233953 A | 10/2009 |

OTHER PUBLICATIONS

Extended European Search Report issued with respect to EP 12759958.7, mailed Aug. 13, 2014.
"Braskem launches a new line of green plastic" Releases Detalhes—Braskem, May 21, 2013.
Chinese Office Action issued with respect to CN 201280014984.8, issued Jun. 13, 2014; along with an English translation thereof.
Search report from International Application No. PCT/JP2012/055822, mail date is Jun. 12, 2012.
Office Action of JP Patent Application No. 2011-066217 mailed Feb. 3, 2015; along with an English Translation thereof.
Notification of Reasons for Refusal for Japanese Patent Application No. 2011-066217 mailed Sep. 2, 2014; along with an English Translation thereof.

* cited by examiner

*Primary Examiner* — Robert S Loewe
(74) *Attorney, Agent, or Firm* — Greenblum & Bernstein, P.L.C.

(57) ABSTRACT

Efficiently produced is a release liner including a plant-derived film as a substrate and having a good appearance, releasability, and adhesion. A method according to the present invention produces a release liner having a plant-derived film substrate and, on at least one side thereof, a release coat layer derived from a thermosetting silicone resin. The method includes the steps as follows:

Step A of applying a thermosetting silicone release agent to at least one side of a plant-derived film substrate, the release agent containing 100 parts by weight of a thermosetting silicone resin and 0.05 to 0.55 part by weight of a curing catalyst;

Step B of drying at 40° C. to 90° C. for 10 to 60 seconds after Step A;

Step C of applying an ultraviolet ray at 50 to 300 mJ/cm$^2$ after Step B; and

Step D of aging at 30° C. to 70° C. for 12 to 240 hours after Step C.

4 Claims, No Drawings

METHOD FOR PRODUCING RELEASE LINER

TECHNICAL FIELD

The present invention relates to methods for producing release liners. More specifically, the present invention relates to a method for producing a release liner that includes a plant-derived film as a substrate and has a good appearance. The present invention also relates to a release liner obtained by the production method. This release liner may be used in the protection of pressure-sensitive adhesive layers typically of pressure-sensitive adhesive tapes, pressure-sensitive adhesive sheets, and labels.

BACKGROUND ART

Plant-derived polymers are received attention as alternative resins to petroleum-derived polymers. Attempts have been made to adopt such plant-derived polymers to release liners. The release liners are generally produced by applying a thermally cross-linkable silicone resin onto a release liner substrate surface, and thermally curing the applied silicone resin. Suppose that a poly(lactic acid) film or cellophane, as a film of the plant-derived polymer, is used as a release liner substrate; and the thermally cross-linkable silicone resin is applied thereon and cured under a regular curing condition of 100° C. or higher. In this case, the resulting release liner suffers from deformation such as wrinkling. To prevent this, there have been proposed techniques for applying a thermally cross-linkable silicone resin to any of the plant-derived film substrates.

Typically, Japanese Unexamined Patent Application Publication (JP-A) No. 2003-026837 proposes a technique of using a silicone resin that is curable at a temperature of lower than 100° C. However, thermally cross-linkable silicone resins usable in this technique are limited to specific ones. In addition, the technique needs reduction in amount of a reaction retardant, thereby suffers from inferior pot stability (shorter pot life) of the silicone resin, and requires special coating equipment.

Japanese Patent No. 4200405, Japanese Patent No. 4200406, and Japanese Patent No. 4214254 disclose techniques of using a biaxially stretched poly(lactic acid) film as a release film substrate. These techniques, however, should perform heat setting (heat fixation) in a specific temperature range of from 145° C. to the melting temperature of the poly(lactic acid).

CITATION LIST

Patent Literature

PTL 1: Japanese Unexamined Patent Application Publication (JP-A) No. 2003-026837
PTL 2: Japanese Patent No. 4200405
PTL 3: Japanese Patent No. 4200406
PTL 4: Japanese Patent No. 4214254

SUMMARY OF INVENTION

Technical Problem

Accordingly, an object of the present invention is to provide a production method for a release liner as follows; and a release liner obtained by the production method. The production method can employ a thermally cross-linkable silicone resin without specific limitation, does not need the reduction in amount of a reaction retardant, and does not need the use of special coating equipment. Thus, the production method can produce a release liner including a plant-derived film as a substrate and having a good appearance.

Another object of the present invention is to provide a production method for a release liner as follows; and a release liner obtained by the production method. The production method can industrially efficiently produce a release liner, which release liner includes a plant-derived film as a substrate; and a release coat layer, has good releasability, exhibits satisfactory adhesion of the release coat layer to the release liner substrate, and has a good appearance substantially without deformation and wrinkling.

Solution to Problem

After intensive investigations to achieve the objects, the present inventors have found that a specific release liner including a plant-derived film as a substrate and a release coat layer lying thereon can be obtained even when curing a thermosetting silicone resin as a release agent at such a low temperature within a relatively short time as not to cause thermal deformation of the plant-derived film; that the resulting release liner has releasability, adhesion of the release coat layer to the substrate, and an appearance at satisfactory levels; and that this is achieved by using a specific amount of a curing catalyst in combination with the thermosetting silicone resin, and producing the release liner through a drying step, an ultraviolet irradiation step, and an aging step under specific conditions. The present invention has been made based on these findings.

Specifically, the present invention provides, in an embodiment, a method for producing a release liner. The release liner includes a plant-derived film substrate; and a release coat layer lying on or over at least one side of the film substrate, and the release coat layer is derived from a thermosetting silicone resin. The method includes the steps as follows:

Step A of applying a thermosetting silicone release agent to at least one side of a plant-derived film substrate to form a coat layer thereon, the thermosetting silicone release agent including 100 parts by weight of a thermosetting silicone resin and 0.05 to 0.55 part by weight of a curing catalyst;

Step B of drying the coat layer after Step A at a temperature of from 40° C. to 90° C. for a duration of from 10 to 60 seconds;

Step C of applying an ultraviolet ray to the coat layer after Step B at a dose of from 50 to 300 mJ/cm$^2$; and Step D of aging the coat layer after Step C at a temperature of from 30° C. to 70° C. for a duration of 12 to 240 hours.

The curing catalyst for use in the production method may be a platinum catalyst.

The plant-derived film substrate for use herein is exemplified by a poly(lactic acid) film, a cellulose film, or a polyamide film.

The poly(lactic acid) film may be a biaxially stretched poly(lactic acid) film.

The present invention further provides, in another embodiment, a release liner including a plant-derived film substrate; and a release coat layer lying on or over at least one side of the film substrate, the release coat layer derived from a thermosetting silicone resin. This release liner is produced by the production method.

Advantageous Effects of Invention

The present invention enables the curing at a low temperature within a short time, thereby less suffers from reduction in coating rate, and enables industrially efficient production of a release liner using a plant-derived film substrate. The present invention enables the production of a release liner including a plant-derived film as a substrate and having a good appearance. This production can be performed using any of a wide variety of thermosetting silicone resins, does not need reduction in amount of a reaction retardant, and does not need the use of special coating equipment. In addition and advantageously, the present invention enables the production of a release liner that includes a plant-derived film as a substrate and a release coat layer lying thereon, has good releasability, exhibits satisfactory adhesion of the release coat layer to the release liner substrate, and is substantially free from or less suffers from deformation and wrinkling.

DESCRIPTION OF EMBODIMENTS

The present invention provides, in an embodiment, a method for producing a release liner that has a plant-derived film substrate; and a release coat layer lying on or over at least one side of the substrate, which release coat layer is derived from a thermosetting silicone resin.

Plant-Derived Film Substrate

The plant-derived film substrate for use in the present invention is not limited, as long as being one derived from a plant (vegetable), and is exemplified by poly(lactic acid) films; cellulose films such as cellophanes; and polyamide films such as polyamide 11 films. The poly(lactic acid)s are produced typically from corn, sweet potato, potato, sugarcane, and rice. The celluloses are produced typically from wood and cotton. The polyamides are produced from vegetable oils such as castor oil. The film substrates may be uniaxially or biaxially stretched. Heat setting after stretching may be performed at a temperature not critical. Of the films, poly(lactic acid) films are preferred for their satisfactory film formability and cost. Among the poly(lactic acid) films, preferred are biaxially stretched poly(lactic acid) films typically for their satisfactory thermal stability.

The thickness of the film substrate is not critical, can be chosen suitable according typically to the intended use and purpose, but is typically preferably from 5 to 300 μm and more preferably from about 10 to about 200 μm. The film substrate may have a single-layer structure or a multilayer structure.

Thermosetting Silicone Resin

The thermosetting silicone resin for use in the present invention is not limited, as long as capable of forming a cured film on a film substrate, which cured film does not adversely affect a pressure-sensitive adhesive while exhibiting appropriate releasability according to the intended use. Typically from the viewpoint of exhibiting satisfactory releasing properties with respect to an adhesive face typically of a pressure-sensitive adhesive tape or sheet, the thermosetting silicone resin is preferably one capable of forming a cured film having a release force of from about 0 to about 300 cN/50 mm and preferably from about 1 to about 100 cN/50 mm with respect to the adhesive face.

The thermosetting silicone resin is represented by, but not limited to, a thermosetting addition-reactive silicone release agent (thermosetting addition-reactive polysiloxane release agent).

The thermosetting addition-reactive silicone release agent includes, as essential components, a polyorganosiloxane containing at least one alkenyl group serving as a functional group per molecule (alkenyl-containing silicone), and a polyorganosiloxane containing at least one hydrosilyl group serving as a functional group per molecule.

Of such polyorganosiloxanes containing at least one alkenyl functional group per molecule, preferred are polyorganosiloxanes having two or more alkenyl groups per molecule. The alkenyl groups are exemplified by vinyl group (ethenyl group), allyl group (2-propenyl group), butenyl group, pentenyl group, and hexenyl group. The alkenyl group(s) is generally bonded to a silicon atom (e.g., a terminal silicon atom or a silicon atom in principal chain) of a polyorganosiloxane forming the principal chain or backbone.

The polyorganosiloxane forming the principal chain or backbone is exemplified by polyalkyl(alkyl)siloxanes (polydialkylsiloxanes) such as polydimethylsiloxanes, polydiethylsiloxanes, and polymethylethylsiloxanes; polyalkyl(aryl)siloxanes; and copolymers each using two or more different silicon-containing monomer components, such as poly(dimethylsiloxane-diethylsiloxane)s. Among them, polydimethylsiloxanes are preferred. Specifically, preferred examples of the polyorganosiloxanes containing at least one alkenyl functional group per molecule include polydimethylsiloxanes having at least one vinyl group, hexenyl group, or another alkenyl functional group.

The polyorganosiloxane crosslinking agents containing at least one hydrosilyl functional group per molecule are polyorganosiloxanes each having at least one hydrogen atom bonded to a silicon atom (particularly a silicon atom with Si—H bonding) per molecule. Among them, preferred are polyorganosiloxanes having two or more silicon atoms each with Si—H bonding per molecule. The silicon atoms with Si—H bonding may be any of silicon atoms in the principal chain and silicon atoms in the side chain. Specifically, they may be contained as constitutional units of the principal chain or constitutional units of the side chain. The number of the silicon atoms with Si—H bonding is not critical, as long as being two or more. Specifically, of the polyorganosiloxane crosslinking agents containing at least one hydrosilyl functional group per molecule, preferred are polymethylhydrogensiloxanes and poly(dimethylsiloxane-methylhydrogensiloxane)s.

The release agent (thermosetting silicone release agent) for use in the present invention may include, in addition to the thermosetting silicone resin, a reaction inhibitor (reaction retardant) to impart storage stability at room temperature to the release agent. Typically when a thermosetting addition-reactive silicone release agent is used as the release agent, the reaction inhibitor is specifically exemplified by 3,5-dimethyl-1-hexyn-3-ol, 3-methyl-1-penten-3-ol, 3-methyl-3-penten-1-yne, and 3,5-dimethyl-3-hexen-1-yne.

In addition to the components, the release agent may further include one or more other components such as a release controlling agent according to necessity. Typically when a thermosetting addition-reactive silicone release agent is used as the release agent, the release agent may further include one or more of components such as release controlling agents (e.g. MQ resins); and polyorganosiloxanes having neither alkenyl group nor hydrosilyl group (e.g., trimethylsiloxy-terminated polydimethylsiloxanes). The release agent may contain these components in a content of preferably, but not limitatively, from 1 to 30 percent by weight of entire solids contents.

The release agent may further include one or more additives according to necessity. Such optional additives are exemplified by fillers, antistatic agents, antioxidants, ultraviolet absorbers, plasticizers, and colorants (e.g., dyestuffs and pigments).

The release agent for use in the present invention includes a curing catalyst. The curing catalyst is preferably exemplified by, but not limited to, platinum catalysts that are generally used as catalysts for thermosetting addition-reactive silicones. Among them, the curing catalyst is preferably at least one platinum catalyst selected from the group consisting of chloroplatinic acid, olefin complexes of platinum, and olefin complexes of chloroplatinic acid. The curing catalyst may be used as intact or as a solution or dispersion in a solvent.

The release agent may contain the curing catalyst in an amount (in solids content) of preferably from 0.05 to 0.55 part by weight and more preferably from 0.06 to 0.50 parts by weight per 100 parts by weight (in resin content) of the thermosetting silicone resin. The release agent, if containing the curing agent in an amount of less than 0.05 part by weight, may be cured at a low curing rate; and, if containing the curing agent in an amount of more than 0.55 part by weight, may have a significantly poor pot stability (short pot life).

A coating composition containing the release agent may be used herein to form the release coat layer. The coating composition generally employs an organic solvent for better coatability. The organic solvent is exemplified by, but not limited to, aliphatic or alicyclic hydrocarbon solvents such as cyclohexane, hexane, and heptane; aromatic hydrocarbon solvents such as toluene and xylenes; ester solvents such as ethyl acetate and methyl acetate; ketone solvents such as acetone and methyl ethyl ketone; and alcohol solvents such as methanol, ethanol, and butanol. Each of different organic solvents may be used alone or in combination as a mixture.

Release Liner Production Method

A release liner production method according to an embodiment of the present invention includes Steps A to D as follows:

Step A of applying a thermosetting silicone release agent to at least one side of a plant-derived film substrate to form a coat layer, the thermosetting silicone release agent including 100 part by weight (in resin content) of a thermosetting silicone resin and 0.05 to 0.55 part by weight (in solids content) of a curing catalyst;

Step B of drying the coat layer after Step A under a condition at a temperature of from 40° C. to 90° C. for a duration of from 10 to 60 seconds;

Step C of applying an ultraviolet ray to the coat layer after Step B at a dose of from 50 to 300 mJ/cm$^2$; and Step D of aging the coat layer after Step C at a temperature of from 30° C. to 70° C. for a duration of from 12 to 240 hours.

In Step A, initially a coating composition having such a viscosity as to be coatable is prepared by adding, to the organic solvent, a thermosetting silicone resin (e.g., a thermosetting addition-reactive silicone release agent), a curing catalyst, and, where necessary, optional additional components (additives) in predetermined proportions. The thermosetting silicone resin can be used as intact or as a solution (thermosetting silicone resin composition) prepared by diluting the thermosetting silicone resin with an organic solvent.

Next, the above-prepared coating composition is applied to one or both sides of the plant-derived film substrate (sheet substrate) to form a thermosetting silicone release agent layer (coat layer) thereon.

The coating may be performed using a customary coater such as a gravure coater, bar coater, reverse roll coater, kiss-contact roll coater, dip roll coater, knife coater, or spray coater.

The thermosetting silicone release agent layer (coat layer) may have a thickness not critical, but may have such a thickness as to give a mass of coating (in solids content) after drying of preferably from 0.01 to 3.0 g/m$^2$, more preferably from 0.03 to 2.0 g/m$^2$, and furthermore preferably from 0.05 to 1.0 g/m$^2$.

In Step B, the film substrate bearing the thermosetting silicone release agent layer (coat layer) after the coating is heated to dry and precure the thermosetting silicone release agent layer [drying (precuring) step].

The heating may be performed at a temperature of preferably from 40° C. to 90° C., more preferably from 50° C. to 80° C., and furthermore preferably from 60° C. to 75° C. The heating, if performed at a temperature of lower than 40° C., may cause an extremely long time to perform the precuring (heating) step, resulting in poor productivity. The heating, if performed at a temperature of higher than 90° C., may readily cause thermal wrinkling; and particularly readily cause thermal wrinkling when the film substrate is a heat-sensitive substrate such as a poly(lactic acid) film or cellophane.

The heating may be performed for a duration (heating time) of preferably from 10 to 60 seconds, more preferably from 15 to 50 seconds, and furthermore preferably from 20 to 35 seconds for better productivity and for less thermal damage on the film substrate.

In Step C, the precured layer, which has been heat-treated as above, is irradiated with an ultraviolet ray to promote the curing of the precured layer (curing promotion step). The ultraviolet irradiation is preferably performed in-line.

This step can employ a known ultraviolet lamp. The ultraviolet lamp for use herein is exemplified by high-pressure mercury lamps, metal halide lamps, and electrode-less ultraviolet lamps. Among them, electrode-less ultraviolet lamps are preferred because they emit ultraviolet rays highly efficiently with small emission of infrared rays, thereby less cause thermal damage on the substrate, and satisfactorily cure the layer (precured layer) containing the thermosetting silicone resin.

The electrode-less ultraviolet lamps usable herein are exemplified by the D bulb, H bulb, H+ bulb, and V bulb supplied by Heraeus Noblelight Heraeus Noblelight Fusion UV Systems, Inc. Among them, the H bulb and H+ bulb supplied by Heraeus Noblelight Fusion UV Systems, Inc. are preferred.

The ultraviolet ray in the ultraviolet irradiation may be applied at a peak irradiance of preferably from 200 to 1000 mW/cm$^2$, more preferably from 300 to 800 mW/cm$^2$, and furthermore preferably from 400 to 600 mW/cm$^2$. The ultraviolet irradiation, if performed at a peak irradiance of less than 200 mW/cm$^2$, may often fail to effectively contribute to better curability. In contrast, the ultraviolet irradiation, if performed at a peak irradiance of more than 1000 mW/cm$^2$, may readily cause the film substrate to be wrinkled due to a temperature rise.

The ultraviolet ray may be applied at an integrated irradiation (light quantity) of preferably from 50 to 300 mJ/cm$^2$, more preferably from 75 to 200 mJ/cm$^2$, and furthermore preferably from 100 to 150 mJ/cm$^2$. The ultraviolet irradiation, if performed at an integrated irradiation of less than 50 mJ/cm$^2$, may often fail to effectively contribute to a higher curing rate; and, if performed at an integrated irradiation of more than 300 mJ/cm$^2$, may disadvantageously cause the separator to have a high release force.

In Step D, the layer, which has been irradiated with an ultraviolet ray to promote curing, is further aged to complete curing (curing step). The aging may be performed typically off-line.

The aging may be performed at a temperature of preferably from 30° C. to 70° C. and more preferably from 35° C. to 50° C. The aging (curing step), if performed at a heating temperature of lower than 30° C., may require an excessively long time to be performed, resulting in poor productivity. The aging, if performed at a heating temperature of higher than 70° C., may often cause the release liner to be thermally wrinkled.

The heating in aging may be performed for a duration of preferably from 12 to 240 hours and more preferably from 24 to 72 hours from the viewpoints of better productivity and less thermal damage on the film substrate. The aging, if performed for a duration of shorter than 12 hours, may cause insufficient curing. The aging, if performed for a duration of longer than 240 hours, may be wasteful or pointless, because the curing reaction has completed before the aging is finished.

The method gives a release liner (separator) as follows with good productivity. The resulting release liner includes a plant-derived film substrate; and a release coat layer on one or both side of the substrate, which release coat layer is formed by curing a thermosetting silicone release agent and has good adhesion to the substrate. The rerelease liner is substantially free from or less suffers from deformation such as wrinkling due to thermal shrinkage and exhibits satisfactory releasability.

The resulting release liner (separator) may be applied to uses exemplified by, but not limited to, the protection of pressure-sensitive adhesive layers typically of pressure-sensitive adhesive sheets, pressure-sensitive adhesive tapes, and labels.

The release liner (separator) according to the present invention, when formed on at least one side of a pressure-sensitive adhesive layer, can give a pressure-sensitive adhesive tape with the separator (including a pressure-sensitive adhesive sheet with the separator). The pressure-sensitive adhesive tape may be a single-coated pressure-sensitive adhesive tape having an adhesive face as only one surface thereof; or a double-coated pressure-sensitive adhesive tape having adhesive faces as both surfaces thereof. The pressure-sensitive adhesive tape may also be a substrate-less pressure-sensitive adhesive tape including a pressure-sensitive adhesive layer alone; or a base-supported pressure-sensitive adhesive tape having a base (substrate) and, on at least one side thereof, a pressure-sensitive adhesive layer.

A pressure-sensitive adhesive to form the pressure-sensitive adhesive layer can be any of known or customary pressure-sensitive adhesives (tacky adhesives), which are exemplified by, but not limited to, acrylic pressure-sensitive adhesives, rubber pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorine-containing pressure-sensitive adhesives, and epoxy pressure-sensitive adhesives. Among them, pressure-sensitive adhesives made from plant-derived materials are particularly preferred.

Though not critical, the pressure-sensitive adhesive layer has a thickness of typically from about 3 to about 100 μm and more preferably from about 5 to about 50 μm.

The base thickness of the base-supported pressure-sensitive adhesive tape can be suitably selected according typically to the strength, flexibility, and purpose and is typically generally, but not critically, about 1000 μm or less (e.g., from about 1 to about 1000 μm), preferably from about 1 to about 500 μm, and furthermore preferably from about 3 to about 300 μm. The base may have a single-layer structure or a multilayer structure.

The pressure-sensitive adhesive tape with the separator can be used typically in known or customary pressure-sensitive adhesive tape uses such as surface-protecting tapes for the protection of polarizing plates.

EXAMPLES

The present invention will be illustrated in further detail with reference to several examples and comparative examples below, which are by no means intended to limit the scope of the invention.

A plant-derived film substrate, a thermosetting silicone release agent, a curing catalyst, an ultraviolet lamp, and a measuring instrument for the measurement of peak irradiance and integrated irradiation of the ultraviolet ray used in the examples are as follows.

Plant-Derived Film Substrate

Poly(lactic acid) film (trade name "TERRAMAC" supplied by UNITIKA LTD., 35 μm thick)

Thermosetting Silicone Release Agent

Thermosetting addition-reactive silicone composition (trade name "KS-847T" supplied by Shin-Etsu Chemical Co., Ltd., 30 percent by weight active ingredient as a toluene solution, having a viscosity of 15000 mPa·s (25° C.))

Curing Catalyst

Platinum catalyst (trade name "PL-50T" supplied by Shin-Etsu Chemical Co., Ltd., a 2 percent by weight solution in toluene)

Ultraviolet Lamp

H Bulb F600 (240 W/cm) supplied by Heraeus Noblelight Fusion UV Systems, Inc.

Measuring Instrument for Measurement of Peak Irradiance and Integrated Irradiation of Ultraviolet Ray UV Checker "UVR-T1" supplied by TOPCON CORPORATION Example 1

In Step A, 100 parts by weight of a thermosetting addition-reactive silicone composition [trade name "KS-847T" (resin content: 30 percent by weight)] and 1 part by weight of a platinum catalyst [trade name "PL-50T" (catalytic component: 2 percent by weight)] were sequentially added to and dissolved in 2900 parts by weight of heptane to give a coating composition; and the coating composition was applied to one side of a 35-μm thick plant-derived film substrate (TERRAMAC) using a #4 Meyer bar to form a coat film. The coating composition was applied in a mass of coating of about 0.1 g/m$^2$ in terms of solids content.

The coat film was dried in an air-forced oven at 70° C. for 30 seconds (Step B). Subsequently, the dried coat film was irradiated with an ultraviolet ray at an irradiance of 500 mW/cm$^2$ (at a light quantity of 100 mJ/cm$^2$) to promote curing of the coat film (Step C); and then left stand at an ambient temperature of 40° C. for 48 hours (Step D); and yielded a release liner (separator).

Example 2

A release liner (separator) was obtained by the procedure of Example 1, except for using the platinum catalyst [trade name "PL-50T" (catalytic component: 2 percent by weight)] in an amount of 3 parts by weight in Step A; and drying the coat film in an air-forced oven at 50° C. for 50 seconds in Step B.

Example 3

A release liner (separator) was obtained by the procedure of Example 1, except for using the platinum catalyst [trade name "PL-50T" (catalytic component: 2 percent by weight)] in an amount of 3 parts by weight in Step A; and aging the coat film at an ambient temperature of 35° C. for 100 hours in Step D.

Example 4

A release liner (separator) was obtained by the procedure of Example 3, except for aging the coat film at an ambient temperature of 40° C. for 48 hours in Step D.

Example 5

A release liner (separator) was obtained by the procedure of Example 3, except for aging the coat film at an ambient temperature of 60° C. for 20 hours in Step D.

Example 6

A release liner (separator) was obtained by the procedure of Example 2, except for drying the coat film in an air-forced oven at 80° C. for 10 seconds in Step B.

Example 7

A release liner (separator) was obtained by the procedure of Example 1, except for using the platinum catalyst [trade name "PL-50T" (catalytic component: 2 percent by weight)] in an amount of 7 parts by weight in Step A.

Comparative Example 1

A release liner (separator) was obtained by the procedure of Example 1, except for using the platinum catalyst [trade name "PL-50T" (catalytic component: 2 percent by weight)] in an amount of 0.5 part by weight in Step A.

Comparative Example 2

A release liner (separator) was obtained by the procedure of Example 1, except for using the platinum catalyst [trade name "PL-50T" (catalytic component: 2 percent by weight)] in an amount of 10 parts by weight in Step A.

Comparative Example 3

A release liner (separator) was obtained by the procedure of Example 4, except for drying the coat film in an air-forced oven at 30° C. for 60 seconds in Step B; irradiating the coat film with an ultraviolet ray at a light quantity of 250 mJ/cm$^2$ in Step C; and aging the coat film at an ambient temperature of 70° C. for 240 hours in Step D.

Comparative Example 4

A release liner (separator) was obtained by the procedure of Example 4, except for drying the coat film in an air-forced oven at 100° C. for 10 seconds in Step B.

Comparative Example 5

A release liner (separator) was obtained by the procedure of Example 4, except for drying the coat film in an air-forced oven at 70° C. for 60 seconds in Step B; irradiating the coat film with an ultraviolet ray at a light quantity of 250 mJ/cm$^2$ in Step C; and aging the coat film at an ambient temperature of 25° C. for 240 hours in Step D.

Comparative Example 6

A release liner (separator) was obtained by the procedure of Example 4, except for aging the coat film at an ambient temperature of 80° C. for 20 hours in Step D.

Evaluation

The coating compositions and release liners (separators) obtained in the examples and comparative examples were evaluated as follows. Evaluation results are indicated in Table 1.

1. Pot Stability (Pot Life)

Three hours after its preparation (mixing), a sample coating composition was subjected to a curing test as follows, and whether the coating composition has good or poor pot stability was determined.

In Table 1, a sample having no practical disadvantage in pot stability is indicated as "good"; whereas one having poor pot stability is indicated as "poor".

Curability Test

Each of the coating compositions obtained in the examples and comparative examples was applied to a 38-μm thick poly(ethylene terephthalate) (PET) film using a #4 Meyer bar to give a coat film. The coat film was dried in an air-forced oven at 130° C. for 60 seconds, retrieved from the oven, rubbed with a finger on the surface where the coating composition was applied (coated surface) to determine the curability. A sample exhibiting neither haze nor coat film loss (peeling off) after rubbing with ten reciprocating motions by the finger was assessed as being cured.

2. Appearance Evaluation

The appearance of each of the prepared release liners was visually inspected. A sample not suffering typically from deformation and wrinkling was evaluated as having a "good" appearance, whereas one suffering typically from deformation and/or wrinkling was evaluated as having a "poor" appearance.

3. Release Liner (Separator) Peel Strength

A pressure-sensitive adhesive tape ("No. 31B #25" supplied by Nitto Denko Corporation, 50 mm in tape width) was temporarily compression-bonded longitudinally to the release coat surface (cured film surface derived from the thermosetting addition-reactive silicone composition) of each of the separators prepared in the examples and comparative examples using a hand roller, and this was cut to the tape width (50 mm) and to a length of about 150 mm.

The resulting article was further compression-bonded with one reciprocating motion of a 2-kg roller, left stand at an ambient temperature of 70° C. under a load of 5 kg with respect to the sample area (50 mm by 150 mm) for 24 hours, cooled at an ambient temperature of 23° C. for one hour, and yielded a measurement sample. The release force (180-degree peel, at a tensile speed of 300 mm/min) of the sample was measured with a tensile tester. A sample having a release force of from 0.03 to 0.20 N/50 mm was assessed as having good releasability.

4. Release Coat Layer Adhesion

The release coat layer (cured film derived from the thermosetting addition-reactive silicone composition) surface of each of the release liners (separators) prepared in the examples and comparative examples was rubbed by a finger through ten reciprocating motions every week after the preparation to determine the adhesion. The adhesion was assessed according to criteria as follows:

Excellent (Exc): Sample suffered from neither haze nor release coat layer loss;

Good: Sample suffered from slight haze;

Fair: Sample suffered from distinct haze and/or slight loss of the release coat layer; and Poor: Sample suffered from distinct loss of the release coat layer to expose the substrate.

TABLE 1

| | | Examples | | | | | | |
|---|---|---|---|---|---|---|---|---|
| | | 1 | 2 | 3 | 4 | 5 | 6 | 7 |
| Silicone resin | KS-847T (30 wt % resin) (part by weight) | 100 | 100 | 100 | 100 | 100 | 100 | 100 |
| Curing catalyst | PL-50T (2 wt % catalyst) (part by weight) | 1 | 3 | 3 | 3 | 3 | 3 | 7 |
| Part by weight of curing catalyst per 100 parts by weight of silicone resin | | 0.07 | 0.20 | 0.20 | 0.20 | 0.20 | 0.20 | 0.47 |
| Solvent | Heptane (part by weight) | 2900 | 2900 | 2900 | 2900 | 2900 | 2900 | 2900 |
| Step B | Drying temperature (° C.) | 70 | 50 | 70 | 70 | 70 | 80 | 70 |
| | Drying time (sec) | 30 | 50 | 30 | 30 | 30 | 10 | 30 |
| Step C | Light quantity (mJ/cm$^2$) | 100 | 100 | 100 | 100 | 100 | 100 | 100 |
| Step D | Aging temperature (° C.) | 40 | 40 | 35 | 40 | 60 | 40 | 40 |
| | Aging time (hr) | 48 | 48 | 100 | 48 | 20 | 48 | 48 |
| | Pot stability | Good | Good | Good | Good | Good | Good | Good |
| | Appearance | Good | Good | Good | Good | Good | Good | Good |
| | Release force (N/50 mm) | 0.04 | 0.04 | 0.03 | 0.03 | 0.03 | 0.05 | 0.03 |
| | Release coat layer adhesion | Good | Good | Exc | Exc | Exc | Good | Exc |

| | | Comparative Examples | | | | | |
|---|---|---|---|---|---|---|---|
| | | 1 | 2 | 3 | 4 | 5 | 6 |
| Silicone resin | KS-847T (30 wt % resin) (part by weight) | 100 | 100 | 100 | 100 | 100 | 100 |
| Curing catalyst | PL-50T (2 wt % catalyst) (part by weight) | 0.5 | 10 | 3 | 3 | 3 | 3 |
| Part by weight of curing catalyst per 100 parts by weight of silicone resin | | 0.03 | 0.67 | 0.20 | 0.20 | 0.20 | 0.20 |
| Solvent | Heptane (part by weight) | 2900 | 2900 | 2900 | 2900 | 2900 | 2900 |
| Step B | Drying temperature (° C.) | 70 | 70 | 30 | 100 | 70 | 70 |
| | Drying time (sec) | 30 | 30 | 60 | 10 | 60 | 30 |
| Step C | Light quantity (mJ/cm$^2$) | 100 | 100 | 250 | 100 | 250 | 100 |
| Step D | Aging temperature (° C.) | 40 | 40 | 70 | 40 | 25 | 80 |
| | Aging time (hr) | 48 | 48 | 240 | 48 | 240 | 20 |
| | Pot stability | Good | Poor | Good | Good | Good | Good |
| | Appearance | Good | Good | Good | Poor | Good | Poor |
| | Release force (N/50 mm) | 0.05 | 0.03 | 0.08 | 0.04 | 0.05 | 0.03 |
| | Release coat layer adhesion | Poor | Exc | Poor | Good | Fair | Exc |

INDUSTRIAL APPLICABILITY

The method for producing a release liner according to the present invention can industrially efficiently produce a release liner using a plant-derived film substrate. The method can employ a wide variety of thermosetting silicone resins as a release agent and enables the production of a release liner including a plant-derived film as a substrate and a release coat layer lying thereon and having a good appearance without the need of reducing in amount of a reaction retardant and without the need of using special coating equipment. The method further enables the production of a release liner, which release liner includes a plant-derived film as a substrate and a release coat layer lying thereon, has good releasability, exhibits satisfactory adhesion of the release coat layer to the release liner substrate, and is substantially free from or less suffers from deformation and wrinkling. The method for producing a release liner according to the present invention is particularly useful typically as a method for producing a release liner for use in the protection of pressure-sensitive adhesive layers of pressure-sensitive adhesive tapes, pressure-sensitive adhesive sheets, labels, and other articles.

The invention claimed is:

1. A method for producing a release liner, the release liner comprising a plant-derived film substrate; and a release coat layer lying on or over at least one side of the film substrate, the release coat layer derived from a thermosetting silicone resin, the method comprising the steps as follows:

Step A of applying a thermosetting silicone release agent to at least one side of a plant-derived film substrate, which comprised at least one selected from the group consisting of a poly(lactic acid) film, a cellulose film, and a polyamide film, to for a coat layer thereon, the thermosetting silicone release agent comprising 100 parts by weight of a thermosetting silicone resin and 0.05 to 0.55 part by weight of a curing catalyst, which comprises a platinum catalyst;

Step B of drying the coat layer after Step A at a temperature of from 40° C. to 90° C. for a duration of from 10 to 60 seconds;

Step C of applying an ultraviolet ray to the coat layer after Step B at a dose of from 50 to 300 mJ/cm$^2$; and Step D of aging the coat layer after Step C at a temperature of from 30° C. to 70° C. for a duration of 12 to 240 hours.

2. The method for producing a release liner, according to claim 1, wherein the poly(lactic acid) film is a biaxially stretched poly(lactic acid) film.

3. A release liner comprising a plant-derived film substrate; and a release coat layer lying on or over at least one side of the film substrate, the release coat layer derived from a thermosetting silicone resin, wherein the release liner is produced by the production method of claim 2.

4. A release liner comprising a plant-derived film substrate; and a release coat layer lying on or over at least one side of the film substrate, the release coat layer derived from a thermosetting silicone resin, wherein the release liner is produced by the production method of claim 1.

* * * * *